United States Patent

[11] 3,556,542

| | | |
|---|---|---|
| [72] | Inventor | René Capgras<br>Paris, France |
| [21] | Appl. No. | 738,331 |
| [22] | Filed | June 19, 1968 |
| [45] | Patented | Jan. 19, 1971 |
| [73] | Assignee | Industrial Development Company<br>Establishments<br>Vaduz, Liechtenstein |
| [32] | Priority | June 19, 1967 |
| [33] | | France |
| [31] | | 48,804 |

[54] TRIM-CORRECTING ARRANGEMENT FOR VEHICLES WITH HYDROPNEUMATIC SUSPENSION
5 Claims, 4 Drawing Figs.

| | | |
|---|---|---|
| [52] | U.S. Cl. | 280/6,<br>267/64 |
| [51] | Int. Cl. | B60g 13/10 |
| [50] | Field of Search | 280/6, 6.1,<br>6.11, 124B |

[56] References Cited
UNITED STATES PATENTS

| 2,920,636 | 1/1960 | Gassner | 280/6H |
| 3,194,581 | 7/1965 | Brueder | 280/6X |

*Primary Examiner*—Philip Goodman
*Attorney*—Karl F. Ross

ABSTRACT: Two hydropneumatic suspension units, acting upon respective wheel mounts on opposite sides of a vehicle frame, are connected in a hydraulic circuit including a pair of contacting valve discs on confronting ends of a pair of torsion shafts which are mechanically linked with the two wheel mounts so as to rotate upon a raising or lowering of the corresponding wheel relative to the vehicle frame. The contacting disc faces have inlet and outlet ports, respectively connected to the high-pressure and low-pressure sides of a fluid supply system, and control ports leading to the oil chambers of the associated suspension units; upon relative rotation of the shafts in one sense or the other, a compensating pressure differential is generated in these oil chambers to restore the normal attitude of the vehicle.

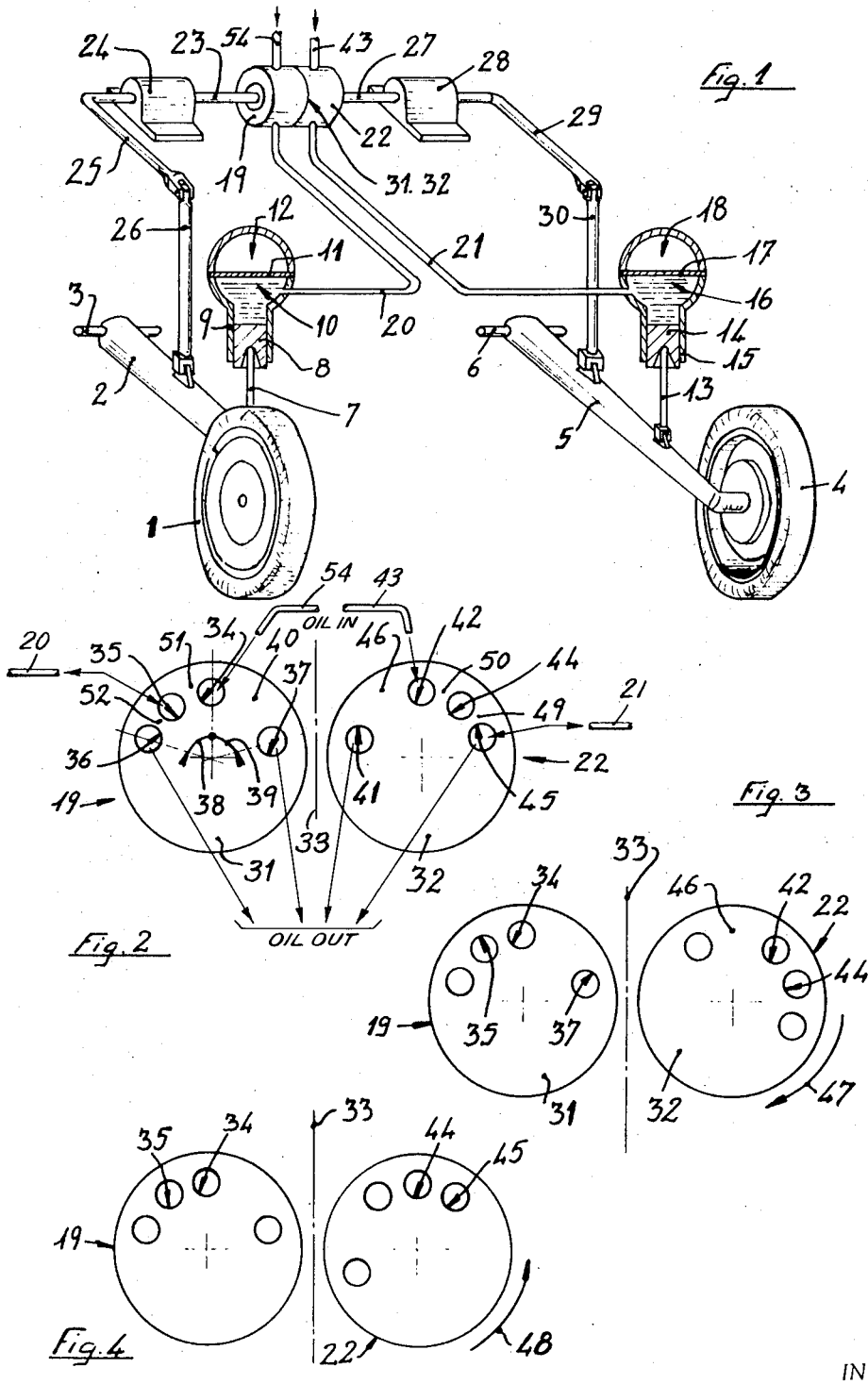

TRIM-CORRECTING ARRANGEMENT FOR VEHICLES WITH HYDROPNEUMATIC SUSPENSION

The present invention relates to improvements in trim-correcting systems for vehicles with hydropneumatic wheel suspension. Its object is to provide a stabilizing arrangement designed to correct the transversal trim or attitude of the vehicle by opposing rolling movement and sway during turning.

According to this invention, a stabilizing mechanism adapted to be fitted between the two rear or front wheels of a vehicle comprises two transverse torsion bars or shafts coaxially disposed and connected to respective suspension arms for the wheels, the other ends of the shafts jointly actuating a hydraulic or electric distributor so as to counteract unsymmetrical wheel motion relative to the vehicle frame by generating a compensatory differential fluid pressure in the two wheel suspensions in response to relative or rotation of the two shafts.

In accordance with a more particular feature of my invention, the distributor comprises two contacting valve discs on the confronting shaft ends each having a feed or inlet port for high-pressure fluid, two return ports for the discharge of the fluid, and a control port leading to an oil chamber of a respective wheel suspension, corresponding ports registering with each other whenever the two wheels are equidistant from the vehicle frame.

The distributor could also be constituted by two turning members confronting each other and carrying electrical contacts capable of opening or closing solenoid valves to generate the aforedescribed pressure differential.

I shall now describe by way of example a preferred embodiment of the invention with reference to the accompanying drawing in which:

FIG. 1 is a schematic perspective view showing the rear axle of a front-wheel-drive car whose hydropneumatic suspension system is equipped with a trim corrector according to the invention;

FIG. 2 is a diagrammatic illustration of the relative position of two confronting disc faces of a distributor (shown side-by-side for convenience) in a position of registry requiring no correction to be carried out;

FIG. 3 is a similar diagram illustrating the relative position of the disc faces in the event of an overpressure in the suspension unit for the right wheel relative to that for the left wheel; and FIG. 4 represents the inverse case with overpressure in the suspension unit for the left wheel relative to that for the right wheel.

The trim-correcting arrangement shown in the drawing is applied to the hydropneumatic suspension system of the rear wheels of a front-wheel-drive vehicle. The left wheel 1 is carried by a suspension arm 2 which oscillates on the chassis or on the body frame around a pivot pin 3. Analogously, the right wheel 4 is attached to a suspension arm 5 which oscillates around a pivot pin 6 carried by the vehicle body or frame.

The suspension arm 2 is connected by a pusher rod 7 to a piston 8 which slides in a cylinder 9. Above the piston, the cylinder forms an oil chamber 10 which is separated from a cushion of compressed gas by a flexible membrane 12.

Similarly, the arm 5 of the right wheel 4 acts by a pusher rod 13 on a piston 14 in a cylinder 15 which has an oil chamber 16. The latter is overlain by a flexible membrane 17 which separates it from a compressed gaseous cushion 18.

In this arrangement the left suspension chamber 10 is connected to a rotatable valve disc 19, forming part of a distributor, by means of a partly flexible conduit 20. In the same manner a conduit 21, also partly flexible, connects the right chamber 16 to an adjoining valve disc 22.

The distributor half 19 is fastened to one end of a torsion bar or shaft 23 which extends transversely under the left half of the frame of the vehicle. At its opposite end this bar passes through a guide bearing 24 in which it turns freely and at the other side of which it is extended by an elbow arm 25. The latter is connected to the suspension arm 2 by a link 26 articu-lated at its two extremities. The bearing 24 is attached to the chassis or frame of the vehicle. In the same manner the right distributor half 22 is fixed to an extremity of a torsion shaft 27 which turns in a bearing 28 at the other side of which it is extended by an elbow arm 29. The latter is connected to the right suspension arm 5 by an articulated link 30.

The two torsion arms 23 and 27 are arranged coaxially so that the associated valve discs 19 and 22 contact each other in a fluidtight manner by their confronting faces 31 and 32.

To facilitate the description, these faces are represented in FIGS. 2—4 in a coplanar position as though swung apart about an imaginary hinge axis 33.

The face 31 has four ports in an arc of a circle centered on its axis, i.e.:

a feed port 34 which a preferably flexible conduit 54 (FIGS. 1 and 5) connects to the high-pressure side of a pump supplying oil under pressure;

a control port 35 to which is connected the conduit 20 communicating with the oil chamber 10 for the left wheel 1; and two return ports 36 and 37 disposed respectively on opposite sides of the ports 34 and 35. The ports 34, 35 and 36 are equidistant whereas the angle 38 representing the peripheral spacing of the ports 34 and 36 is equal to the corresponding angle 39 of the ports 34 and 37. Thus, a blank space 40 is left between the feed port 34 and the return port 37.

The ports 36 and 37 are connected via nonillustrated conduits to the low-pressure side of the hydraulic circuit. On the face 32 of the right distributor 22 there are also provided four ports, namely:

a return port 41;

a feed port 42 which communicates by a conduit 43 (FIG. 1) with the high-pressure side of the hydraulic circuit;

a control port 44 which the conduit 21 connects to the oil chamber 16 of the suspension for the right wheel 4; and a return port 45.

The ports 42, 44 and 45 are equidistant whereas there is left on the face 32 a blank space 46 between the ports 41 and 42 whose angular spacing is twice that of the other ports.

The functioning of the apparatus is as follows:

When the two wheels 1 and 4 support equal loads and are therefore on the same level, the trim-correcting arrangement is at rest and the distributor discs 19 and 20 occupy the position indication schematically in FIG. 2. In this case, the ports 37, 34, 35 and 36 of the disc face 31 register respectively with the ports 41, 42, 44 and 45 of the disc face 321. The result of this alignment is that the feed conduits 54 and 43 communicate with each other while the conduits 20 and 21 are interconnected by the ports 35 and 44. The volume of oil contained in the suspension chambers 15 and 16 and in the conduits 20 and 21 is then constant and this circuit remains isolated from the general feed and return circuit of the vehicular hydraulic system.

It will be observed that this distributor position is independent of the absolute value of the load carried by the rear wheels 1 and 4, i.e. of the corresponding ground clearance. This is so because discs 19 and 22 stay aligned without relative angular movement regardless of any parallel swing of the two torsion shafts 23 and 27 about their pivotal axes relative to the frame-supported bearings 24, 28.

It will be understood that the distributor could also be designed to isolate the conduits 20 and 21 from each other in the neutral position illustrated in FIG. 2.

If for one reason or another the vehicle tends to incline towards the left, as for example under the effect of centrifugal force in the course of a turning to the right or by reason of a poor distribution of the live load, there occurs an angular displacement between the facing ends of the torsion shafts 23 and 27. The distributor disc 22 then turns in the direction of the arrow 47 (FIG. 3), i.e. clockwise, with respect to its mate 19. The port 34 of the face 31 then confronts the solid part 46 of the face 32 which blocks the feed conduit 54. On the other hand, the port 42 registers with the port 35 so that the high-pressure fluid in the conduit 43 is directed into the left-hand oil chamber 10 to expand the suspension for wheel 1. Simultaneously the port 44 comes into alignment with the drain 36 whereby the right-hand oil chamber 16 is connected to the return circuit so as to contract the suspension for the wheel 4. Thus it is possible to rectify the inclination of the vehicle whose trim is therefore maintained in opposition to the rolling movement.

If the frame of the vehicle tends to lean to the other side, i.e. to overcompress the suspension for the right wheel, analogous compensation takes place as illustrated in FIG. 4. The right distributor disc 22 then turns counterclockwise, i.e. in the direction of the arrow 48, with respect to the left disc 19 and the feed port 34 directs oil under pressure into the port 44 to expand the right suspension 14, 15 and 16 whereas the left suspension 8, 9 and 10 contracts on being drained by the aligned ports 35 and 45.

Between the ports there are lands 49, 50, 51 and 52 (FIG. 2). These lands permit the isolation of one suspension unit from the other if it is desired to avoid an equalization of pressure of the two gas cushions 12 and 18 with a view to compensating the effect of a possibly asymmetry persisting in the load.

In the case of an alternating rapid movement of one of the oscillating arms 2 and 5, as for example when a wheel encounters an obstacle on the road or when the vehicle is running on cobbles, the inertia of the differential distributor 19, 22 and the friction in its support bearings (not shown) may be so chosen that these movements are absorbed only by the torsion bars 23 and 27 which allows the suspension to retain all its flexibility without displacement of one of the faces 31 and 32 with respect to the other.

It should be understood that the preceding description has been given only by way of example and that it is not intended to limit the scope of the invention to the details described above. In particular, the tilt-correcting arrangement herein disclosed can be used on vehicles of a type having two or three axles and possessing any desired number of driving wheels. Also one could utilize it on vehicles whose wheels are suspended with the aid of any kinematic arrangement, be it by articulated parallelogrammatic linkages, by oscillating arms, or by a rigid axle.

I claim:
1. A trim-correcting system for a vehicle having a pair of wheels on opposite sides of a frame, comprising:
   two supports, one for each wheel, independently movable with reference to said frame in a vertical direction;
   a pair of fluid-actuated suspension units respectively bearing upon said supports in a manner tending to elevate said frame with reference to the corresponding wheels;
   a source of high-pressure fluid for said units;
   a pair of coaxial shafts rotatably journaled on said frame and mechanically linked with said supports, respectively, for independent rotation in response to vertical displacement of the respective wheels relative to said frame;
   a pair of control elements confrontingly mounted on juxtaposed ends of said shafts for rotary entrainment thereby; and
   distributor means including said control elements establishing a fluid path between said source and said suspension units, in response to relative rotation of said shafts, for generating in said units a pressure differential tending to level said frame with reference to said wheels, thereby restoring said control elements to a normal relative position with elimination of said pressure differential.

2. A system as defined in claim 1 wherein said control elements are a pair of valve discs having contacting faces provided with eccentrically positioned ports including inlet ports communicating with said source, outlet ports for the discharge of said fluid, and control ports leading to said suspension units, corresponding ports on said contacting faces registering with one another in said normal relative position.

3. A system as defined in claim 2 wherein, on each of said faces, an inlet port and a control port are flanked by a pair of outlet ports.

4. A system as defined in claim 3 wherein said inlet port is angularly equispaced from said pair of outlet ports, said control port being interposed between said inlet port and one of said outlet ports.

5. A system as defined in claim 2 wherein each of said suspension units includes a piston cylinder with a flexible membrane dividing the interior thereof into a hydraulic chamber and a gas cushion, said control ports being connected with said hydraulic chambers.